(12) United States Patent
Tucker, Jr. et al.

(10) Patent No.: US 8,672,424 B2
(45) Date of Patent: Mar. 18, 2014

(54) VEHICLE TRACK WITH IMPROVED PERFORMANCE

(75) Inventors: Jasper J. Tucker, Jr., Medford, OR (US); Benjamin J. Vandagrift, Eagle Point, OR (US)

(73) Assignee: Tucker Sno-Cat Corporation, Medford, OR (US)

( * ) Notice: Subject to any disclaimer, the term of this patent is extended or adjusted under 35 U.S.C. 154(b) by 315 days.

(21) Appl. No.: 13/028,115

(22) Filed: Feb. 15, 2011

(65) Prior Publication Data

US 2012/0104841 A1    May 3, 2012

Related U.S. Application Data

(60) Provisional application No. 61/407,850, filed on Oct. 28, 2010.

(51) Int. Cl.
*B62D 55/28* (2006.01)

(52) U.S. Cl.
USPC .......................................................... 305/180

(58) Field of Classification Search
USPC ......... 305/157, 158, 165, 178, 179, 180, 181, 305/182, 187, 191, 192
See application file for complete search history.

(56) References Cited

U.S. PATENT DOCUMENTS

| | | | | |
|---|---|---|---|---|
| 3,387,897 A | * | 6/1968 | Reid | 305/41 |
| 3,610,708 A | * | 10/1971 | Muecke | 305/181 |
| 3,703,321 A | * | 11/1972 | Schoonover | 305/166 |
| 3,715,146 A | * | 2/1973 | Robertson | 305/181 |
| 3,848,936 A | * | 11/1974 | Tsuchiya et al. | 305/181 |
| 4,194,583 A | * | 3/1980 | Aaen | 180/190 |
| 4,241,956 A | * | 12/1980 | Meisel, Jr. | 305/181 |
| 4,278,302 A | * | 7/1981 | Westimayer et al. | 305/120 |
| 4,795,222 A | * | 1/1989 | Smith | 305/181 |
| 6,007,166 A | * | 12/1999 | Tucker et al. | 305/135 |
| 6,983,812 B2 | | 1/2006 | Tucker | |

(Continued)

FOREIGN PATENT DOCUMENTS

| | | |
|---|---|---|
| DE | 29504677 | 7/1995 |
| WO | WO91/02675 | 3/1991 |
| WO | WO97/30883 | 8/1997 |

OTHER PUBLICATIONS

Hans-Hall, "Alu-Steel Cleats," http://www.hans-hall.com/englisch/a-s-stege.htm (downloaded Feb. 15, 2011).

(Continued)

*Primary Examiner* — S. Joseph Morano
*Assistant Examiner* — Jean Charleston
(74) *Attorney, Agent, or Firm* — Klarquist Sparkman, LLP

(57) ABSTRACT

In some implementations, a flexible track for a tracked vehicle comprises a flexible belt with an inner surface and a ground-engaging surface, the ground-engaging surface comprising outwardly projecting lugs spaced apart along the track, wherein at least one of the lugs comprises a vertical section having a curved leading edge. In some implementations, the flexible track comprises a flexible belt with an inner belt surface, an opposite outer belt surface and at least one track bar attached to the outer surface and extending approximately perpendicular to a direction of the track's travel, the track bar having an outer surface with multiple projecting lugs and an inner surface with at least one holding element, and wherein when the track bar is tightened against the outer belt surface, the holding element engages the outer belt surface, thereby reducing slipping between the flexible belt and the track bar.

29 Claims, 8 Drawing Sheets

(56) References Cited

U.S. PATENT DOCUMENTS

| | | | |
|---|---|---|---|
| 7,370,918 B2 | 5/2008 | Tucker | |
| 7,422,295 B2* | 9/2008 | Rasmussen et al. | 305/178 |
| 7,866,767 B2* | 1/2011 | Lemaire et al. | 305/178 |
| 2009/0195061 A1* | 8/2009 | Bellemare | 305/157 |

OTHER PUBLICATIONS

Hans-Hall, "Aluminum Cleats," http://www.hans-hall.com/englisch/a-stege.htm (downloaded Feb. 15, 2011).

Hans-Hall, "Cleat Fittings," http://www.hans-hall.com/englisch/bestueck.htm (downloaded Feb. 15, 2011).

Hans-Hall, "Rubber Cleat," http://www.hans-hall.com/englisch/g-stege.htm (downloaded Feb. 15, 2011).

Hans-Hall, "Steel Cleats," http://www.hans-hall.com/englisch/s-stege.htm (downloaded Feb. 15, 2011).

Soucy, "Agricultural Brochure," Model Nos. ST-012, ST-015, ST-025 and ST-032, http://www.soucy-track.com/en-CA/documentation (printed Apr. 30, 2013).

* cited by examiner

VEHICLE TRACK WITH IMPROVED PERFORMANCE

CROSS-REFERENCE TO RELATED APPLICATION

This application claims the benefit of U.S. Provisional Patent Application No. 61/407,850, filed Oct. 28, 2010, which is hereby incorporated by reference.

FIELD

The present application relates to endless track-driven vehicles, and in particular to improved tracks for such vehicles.

BACKGROUND

Endless track-driven vehicles are commonly used off-road in difficult terrain and under difficult terrain conditions, such as in mud, snow, sand, and tundra. For example, tracked vehicles are used in snow country for grooming ski slopes and snow mobile trails, for transporting skiers to back-country slopes, for ski resort maintenance work, and for snow and mountain rescue. They are also used in various types of terrain for utility company maintenance work, and for oil exploration and oil pipeline maintenance in arctic tundra.

Tracked vehicles are generally of two types. Many are two-tracked in which a pair of endless drive track units, one on each of the opposite sides of the vehicle, support and drive the vehicle. Others are four-tracked, in which four separately driven and independently suspended drive track units, two in front and two in the rear, support and drive the vehicle.

Four-tracked vehicles have certain advantages over two-tracked vehicles under extreme conditions such as on steep slopes and in very rough terrain because of the flexible independent suspensions of the track drive units and the constant power available to all of the track drive units, even while turning. Unlike a two-tracked vehicle which relies on the differential speed of the two tracks for turning, a four-tracked vehicle steers much like a wheeled vehicle. Its endless drive track units can be physically turned for steering.

In any tracked vehicle, the tracks play an important role in the vehicle's overall performance. It would be advantageous to extend the useful life or to increase the durability of conventional tracks, and also to improve their performance, particularly in snow.

SUMMARY

Described below are implementations of flexible track for a tracked vehicle that improve upon conventional tracks.

According to one implementation, a flexible track comprises a flexible belt with an inner surface and a ground-engaging surface, the ground-engaging surface comprising outwardly projecting lugs spaced apart along the track, wherein at least one of the lugs comprises a vertical section having a curved leading edge. It has been discovered that the curved leading edge tends not to retain snow and/or ice, thus keeping these track surfaces free, which lowers the weight of the track, reduces possible interference between the track and the chassis due to a build-up of snow and/or ice and keeps the lugs in a condition ready to provide satisfactory traction.

Similar to the curved leading edge, at least one of the lugs can comprise a curved trailing edge opposite the curved leading edge.

The flexible track's outwardly projecting lugs can be spaced apart in the longitudinal direction of the ground-engaging surface. The lugs can be spaced apart in a lateral direction of the ground-engaging surface.

The flexible track's ground-engaging surface can comprise outer surfaces of multiple track belts. For example, the ground-engaging surface can comprise four spaced apart track belts interconnected by laterally extending tread strips. As another example, the flexible track can be configured as a single track belt.

The curved leading edge of the at least one lug can be defined by a spline curve. In some implementations, at least an outer extent of the at least one of the lugs has a curved side surface about an entire periphery.

In some implementations, at least one of the lugs comprises a distal end surface. For example, the at least one lug may comprise at least a side surface and an end surface, and wherein the side surface and the end surface are curved surfaces.

In some implementations, the lugs comprise bi-directional V-shaped lugs. In some implementations, at least one of the lugs may be in a series of generally alternating V-shaped lugs extending in a lateral direction. At least two of the alternating V-shaped lugs may be joined together.

In another implementation, a flexible track for a tracked vehicle comprises a flexible belt with an inner belt surface, an opposite outer belt surface and at least one track bar attached to the outer surface and extending approximately perpendicular to a direction of the track's travel, the track bar having an outer surface with multiple projecting lugs and an inner surface with at least one holding element, and wherein when the track bar is tightened against the outer belt surface, the holding element engages the outer belt surface, thereby reducing slipping between the flexible belt and the track bar. By reducing the slipping between the track bar and the flexible belt, traction is improved and wear on the belt is reduced.

The flexible belt can be configured in multiple belt sections, and wherein the attachments of the track bar to the multiple belts can thus assist in maintaining the multiple belt sections in desired positions relative to each other.

The track bar can have a two-piece construction, and the outer surface with the multiple projecting lugs can be formed of a resilient material, and the inner surface can be formed of a metal or other similar material.

In some implementations, the holding element comprises at least one raised rib. In some implementations, there is at least one rib positioned on each side of a central axis of the track bar. In some implementations, there is at least one pair of ribs positioned on either side of a central axis of the track bar. In some implementations, the rib or ribs has a generally triangular cross-section.

The rib and inner surface of the track bar can be made of a metal, and the flexible belt can be made of a resilient material so that when the track bar is installed on the flexible belt, the track bar's deformation of the resilient material serves to keep the track bar in place.

These and other implementations are described below. The foregoing features and advantages will become more apparent from the following detailed description, which proceeds with reference to the accompanying figures.

DETAILED DESCRIPTION

Figure 1:
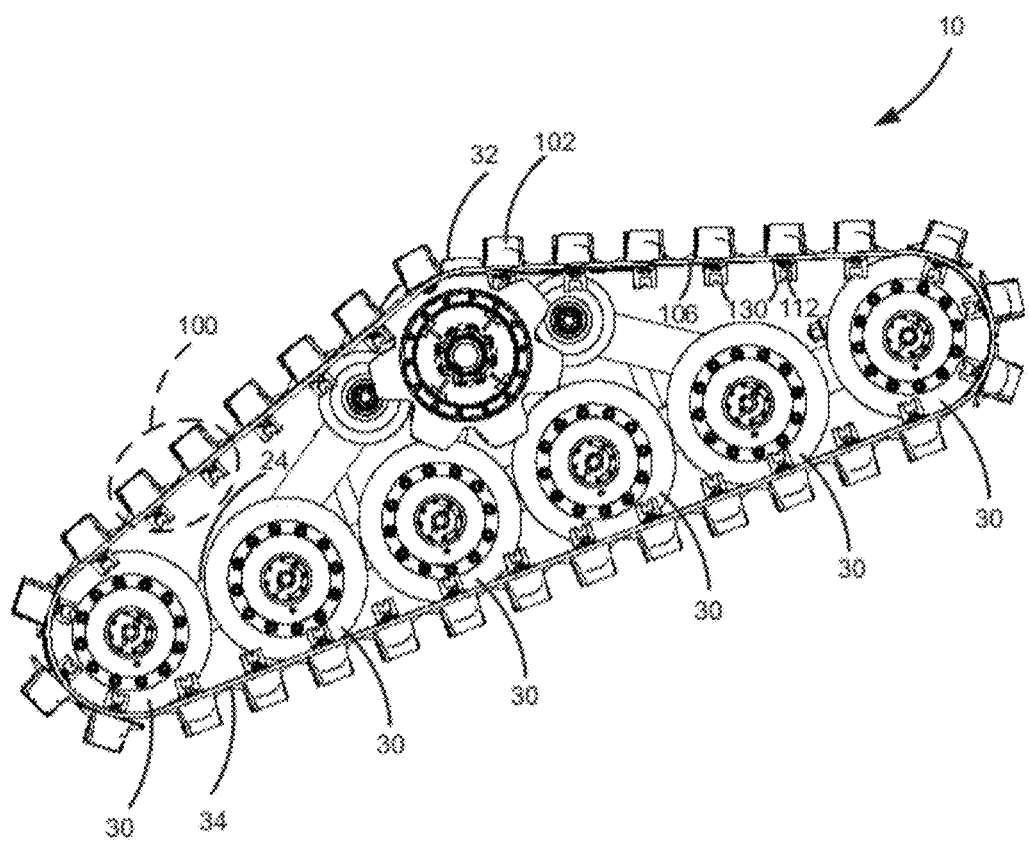
FIG. 1 is side elevation view of a single track unit having an endless drive track with the new tread features.

FIG. 1 is a side elevation view of a single track unit 10 for use on a multi-track vehicle, such as the four-track all terrain vehicle shown in the assignee's U.S. Pat. No. 6,983,812, which is incorporated herein by reference. The track unit 10 comprises a horizontal carrier beam 24 extending in a longitudinal direction and connected to a vehicle chassis through a drive axle and other supporting members (not shown). Multiple guide wheel assemblies 30, such as the six such assemblies in the illustrated implementation, and a drive wheel assembly 32, support an endless drive track 34 to be driven in either direction about a generally triangular configuration as shown. The endless drive track 34 is configured in the form of a belt assembly made of resilient material with attached lugs, as will be described below in greater detail.

Figure 2:
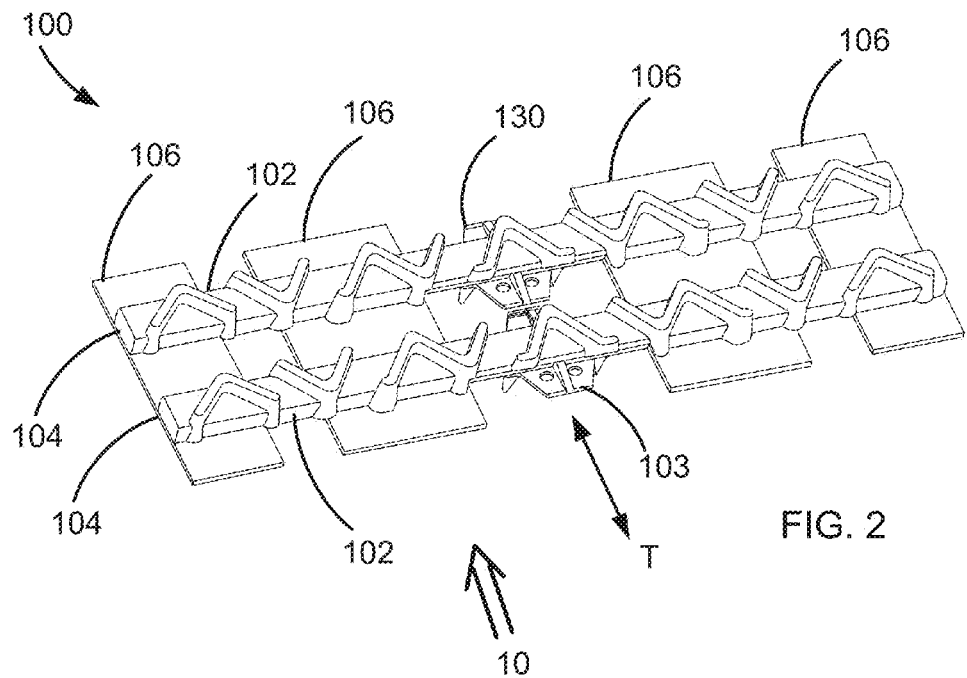
FIG. 2 is a perspective view of a section of a track unit showing the traction bars that contact the surface over which the vehicle is driven.

FIG. 2 is a perspective view of a section of track 100 from the track unit 10. The direction of track travel, which is parallel to the longitudinal axis, is indicated at T. As can be seen in the figure, one or more continuous belts 106 configured in parallel can comprise the endless drive track 34. In the illustrated example, there are four such belts 106 that are spaced apart from each other in the lateral direction. In the illustrated example, the outermost belts are slightly narrower than the inner belts.

Figure 3:
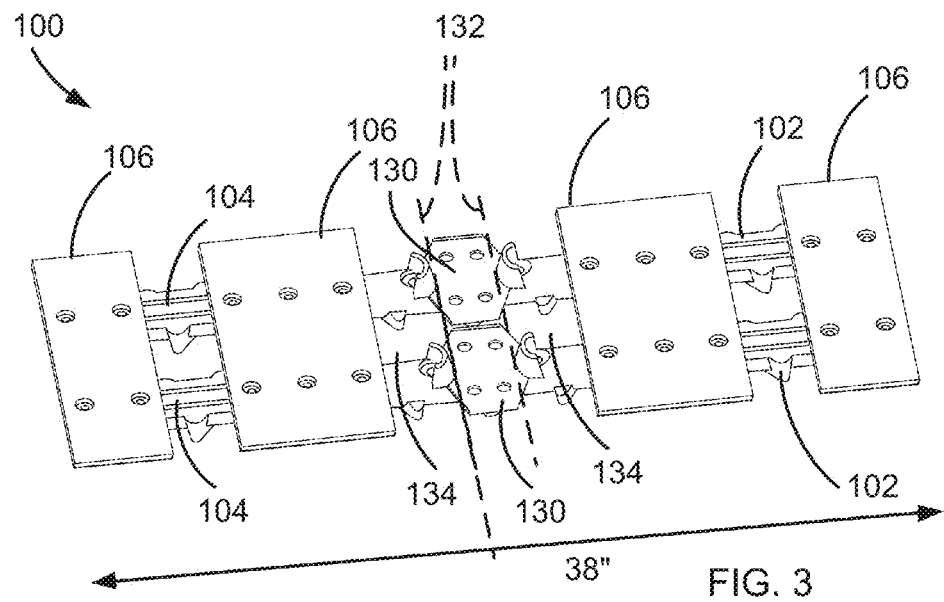
FIG. 3 is a perspective view of the section of a track unit of FIG. 2 viewed from the opposite side and showing the inner surface.

Extending laterally across and interconnected with the belts 106 are tread strips 102. In the FIG. 2 implementation, the tread strips 102 overlie and are supported by traction bars 104. Referring to FIG. 3, which is a perspective view of the tread section 100 from the opposite side, the traction bars 104 are preferably made of a metal or other comparatively high strength material and form a support over which the tread strips 102, which are made of rubber or other similar material, are applied. For example, the treads strips 102 can be extruded or molded over the traction bars 104. In one implementation, the track section is about 38 inches wide in the lateral direction.

Figure 4:
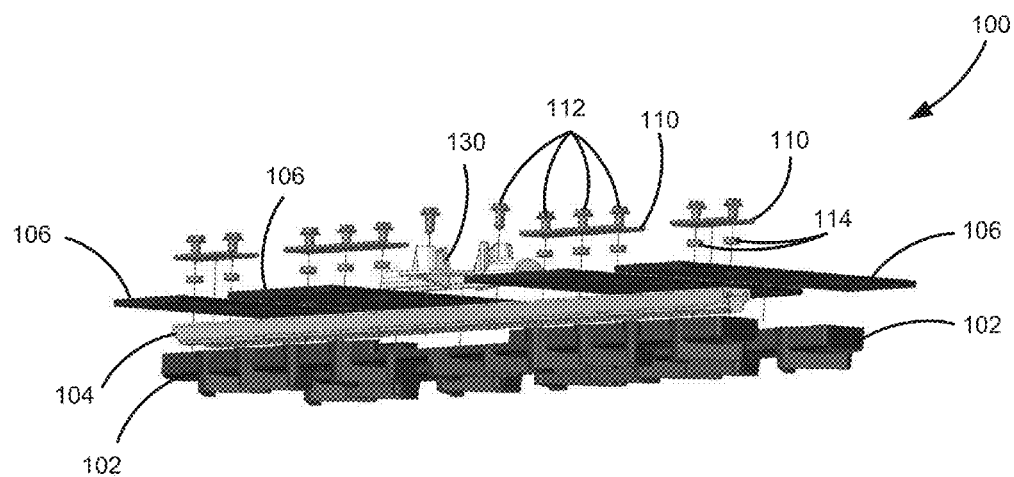
FIG. 4 is an exploded perspective view of the section of a track unit of FIGS. 2 and 3.

FIG. 4 is an exploded perspective view of the track section 100 showing how the various components are assembled together. Each of the traction bars 104 (for clarity, only one is shown in FIG. 4) is secured to the belts 106 with fasteners 112, such as threaded bolts. Optionally, as described in more detail below, backer plates 110 and bushings 114 may be provided to prevent the comparatively resilient material of the belts 106 from tearing.

Figure 5:
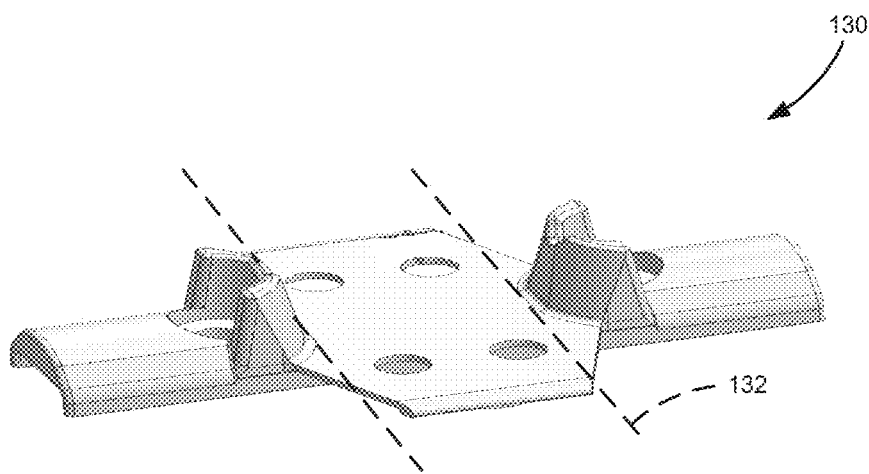
FIG. 5 is a perspective view of a drive saddle.

At the lateral center of the track section 100, there is drive saddle 130 secured to each traction bar 104 with bolts or other fasteners. As best shown in FIG. 3, the drive saddle 130 defines a guide wheel path 132 along which the guide wheels 30 travel as the endless drive track 34 circulates. On either side of the guide wheel path 132, there are drive teeth receiving spaces 134 defined for receiving the teeth of the drive wheel assembly 32. The drive saddle is preferably made of a durable and strong material, such as a metal. FIG. 5 is a perspective view that shows the drive saddle 130 in greater detail.

Figure 6:
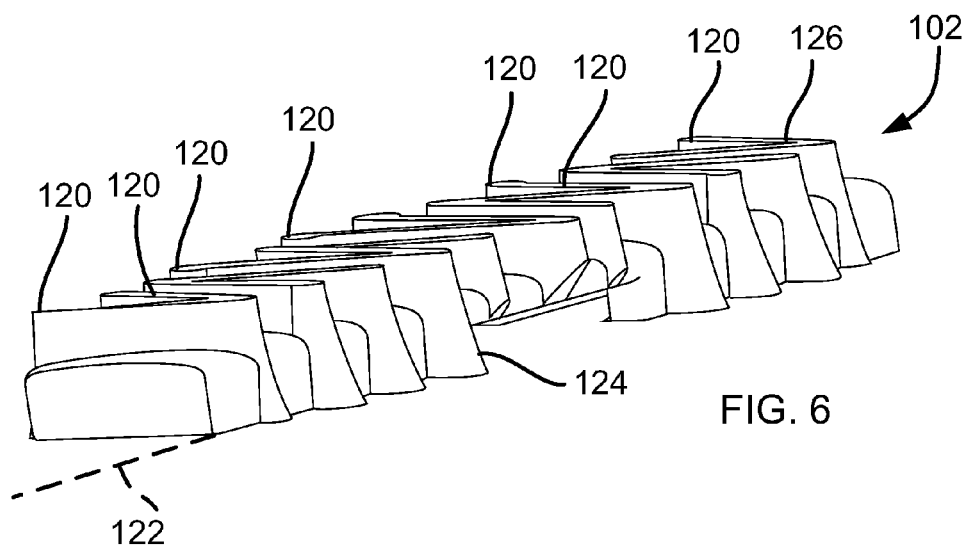
FIG. 6 is a perspective view of the traction bar showing a row of lugs extending in the lateral direction along the tread strip.

FIG. 6 is a perspective view of the tread strip 102. The tread strip 102 comprises a series of lugs 120, which are raised projections extending away from a base level 122 of the rubber-covered track bar 104. Each of the lugs 120 has at least one side surface, such as a curved side surface, and more specifically, a surface having a curved profile or edge 124 when viewed as a vertical section. Stated differently, each lug has at least a portion having a curved leading or trailing edge as seen in a vertical section of the lug, such as at the right and left sides of the lugs shown in FIG. 7A.

In the illustrated implementation, the lugs 120 have end surfaces 126 defined at their distal ends. In the illustrated implementation, the end surface 126 is generally parallel to adjacent sections of the belts 106 (when the track is stretched flat).

In the illustrated implementation, the lugs 120 are configured as V-shaped lugs arranged in a generally alternating pattern in the lateral direction, with breaks between most of the V-shaped lugs, as best shown in FIG. 2. More specifically, there are seven discrete V-shaped lugs 120 projecting from each tread strip 102, including: (1) outermost single V-shaped lugs pointing in a first direction, (2) intermediate single V-shaped lugs spaced inwardly from the outermost V-shaped lugs and pointed in a second direction opposite the first direction, (3) joined V-shaped lugs positioned inwardly of the intermediate single V-shaped lugs and (4) a center V-shaped lug pointed in the first direction. The center V-shaped lug can have ends that extend laterally as shown. The illustrated implementation is exemplary only, and the lugs may be provided in a number greater or lesser than seven, and in configurations having other than V-shaped. As can be seen, the tread strip 102 is highly balanced, as there are lugs "pointed" in each of the two possible directions of track travel (i.e., for forward travel and for reverse travel), and thus the pattern of lugs is also described as "bi-directional."

Figure 7A:
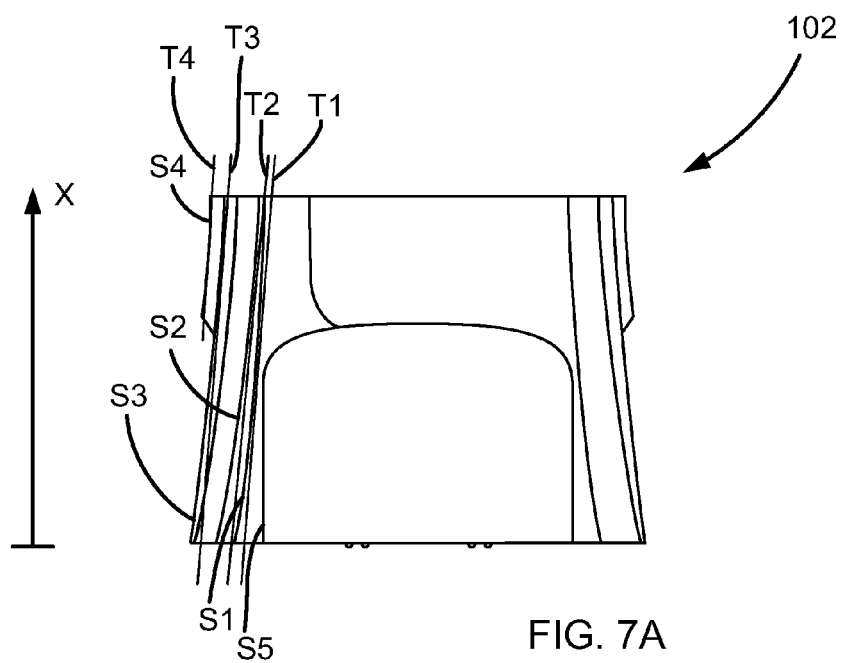
FIG. 7A is an elevation view of an end of the tread strip showing the lugs in elevation.
Figure 8:
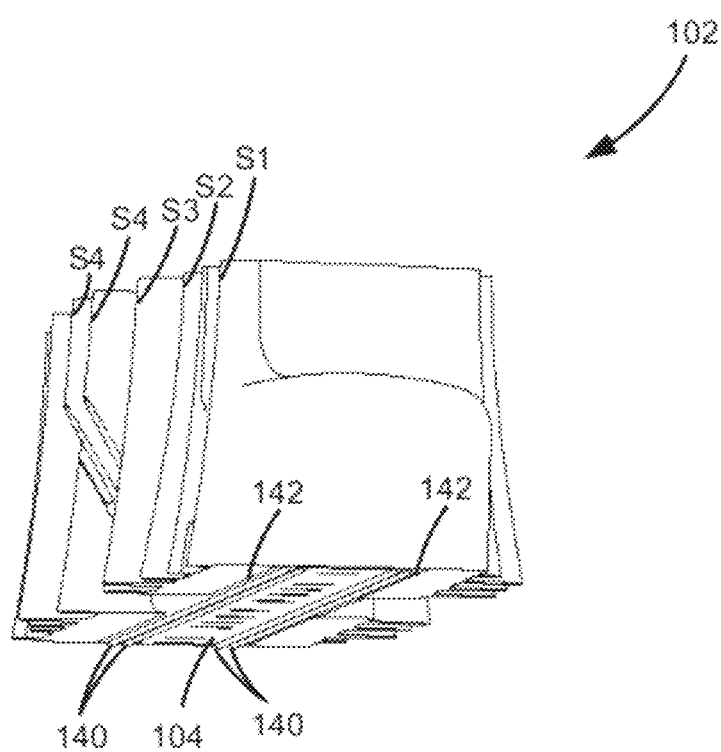
FIG. 8 is a perspective view of the traction bar extending from the end view of FIG. 7A and showing an inner surface of the traction bar configured for mounting to the track.

FIG. 7A is an enlarged end view in elevation of the tread strip 102 and traction bar 104. FIG. 8 is a corresponding perspective view extending from the FIG. 7A end view. As shown at the left sides of FIGS. 7A and 8, the side surfaces of the lugs 120, such as is shown for the exemplary side surfaces S1, S2, S3 and S4, are curved. As can be seen in the end view of FIG. 7A, the curved side surface profiles, e.g., S1, S2, S3 and S4, are distinct from their corresponding straight tangent lines T1, T2, T3 and T4. These curved side surface profiles are also referred to as the leading and trailing edges of the lugs when viewed in a vertical section such as FIG. 7A. It has been discovered that curved side surfaces such as those shown in the figures tend to release snow and ice, whereas conventional straight surfaces tend to retain snow and ice, which is a disadvantage. In the illustrated implementations, the side surfaces that are curved when viewed in elevation have profiles defined by a spline curve.

In the illustrated implementation, the side surfaces have a concave curvature. A concave curvature produces a "scooping" effect as the lugs circulate, and improves traction. It would also be possible to achieve at least some of the snow and ice shedding benefits with a convex curvature, or mixed convex and concave curvatures. In the illustrated implementation of FIG. 7, an average curvature for the exemplary side surfaces S1, S2, S3 and S4 can be expressed as second order polynomial equation:

$$y=0.0009x^2+0.0061x+0.0003$$

where x is the height of the tread measured from the base level of the lug. In general, an effective range of curvatures is $y=0.0009x^2+0.0061x+0.0003$, ±25%.

It should be noted that the surface S5, which is generally straight in FIG. 7A, could be curved, but even as a straight surface, it does not overly detract from satisfactory snow and ice shedding because it is located near the end of the tread strip 102 and is not located close to other surfaces tending to define a closed area. Although omitted from the drawings for clarity in showing the curvature of the side surfaces (see FIG. 7A), these side surfaces are typically radiused in areas adjacent the tread strip 102 so as to smoothly blend the protruding lugs and the base tread strip 102 together.

Figure 7B:
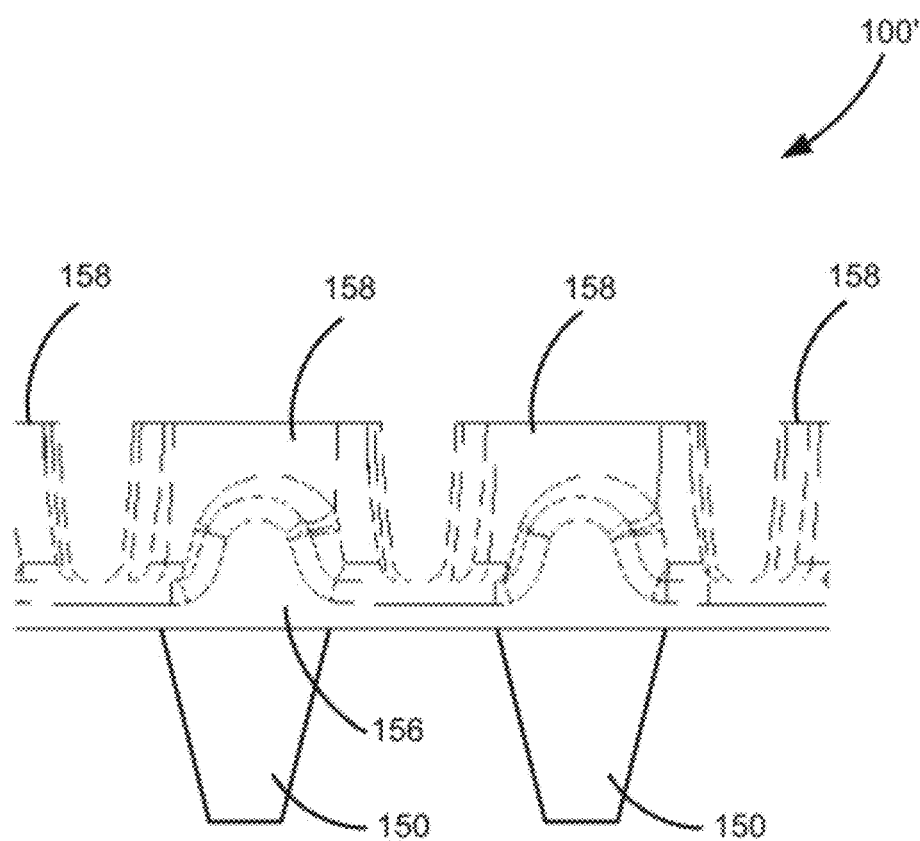
FIG. 7B is an elevation view of a section of a one-piece track unit.

In the description above, the track unit 10 has a multi-piece configuration comprising belt(s) 106, tread bars 104 and tread strips 102. The curved side surfaces can also be implemented for a so-called "one piece" track unit, a section 100' of which is shown in FIG. 7B. In the section 100', generally triangular drive lugs 150 are formed as one-piece with and extend from an inner side of a belt 156. Traction lugs 158 each having at least one curved side surface are formed as one piece with and extend from an outer side of the belt 156. Additional details on the construction of belts and track units is given in U.S. Pat. No. 6,007,166, which is hereby incorporated by reference.

FIG. 8 shows the inner side of the track bar 104 in more detail. In the illustrated implementations, the track bar is shown with optional ribs 140 that permit the track bar 104 to be secured in place with greater assurance than conventional track bars. The ribs 140 extend in a generally lateral direction and are designed to at least bear against and preferably deform the adjacent resilient material of the belts 106 when assembled.

Figure 9:
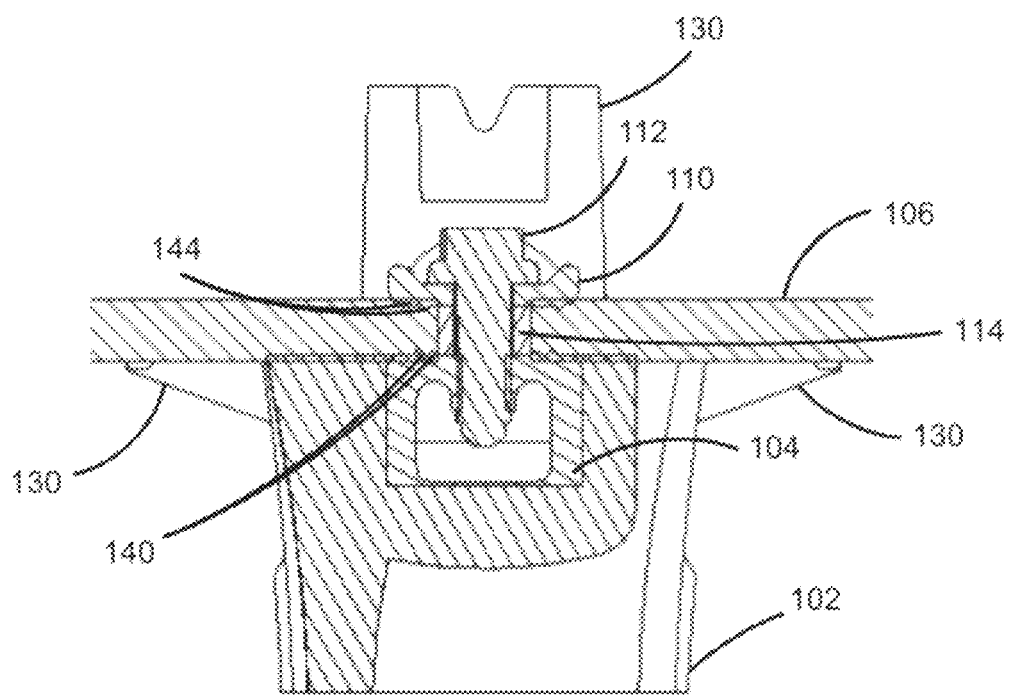
FIG. 9 is a section view in elevation showing the traction bar attached to the track.

FIG. 9 is an elevation view from one end of FIG. 3 along one of the tread strips 102. As assembled, the fastener or bolt 112 extends through the backer plate 110, the bushing 114 (which is within an opening through the belt 106) and is threadedly engaged with the track bar 104 on the opposite side of the belt 106. As a result, the ribs 140 and similar ribs 144 on the backer plate 110 each engage an adjacent surface of the belt 106 when the bolt 112 is tightened, tending to retain the track bar 104 in its position approximately perpendicular to the belt 106 and the direction of travel. The bushing 114 is sized to permit sufficient compression of the belt 106 for satisfactory grip, and to serve as a stop to prevent further tightening that might damage the belt given the range of movement that must be accommodated as the belt 106 and the attached tread strips 102 circulate. In the illustrated implementation, the belt 106 has a thickness of about 0.50 in, and the bushing is sized with a height of about 0.40 in, thus allowing the bolt 112 to be tightened against the track bar 104 until the belt 106 is compressed by about 0.10 in. In other embodiments, it is sufficient to compress the belt 106 by about 0.050 in. With the increased holding power of the ribs 140 and/or the ribs 144 against the belt 106, the track bar 104 is less likely to become loosened under torsional loads such as during extreme turning maneuvers.

In FIG. 9, the ribs 140 and the ribs 144 each have a triangular profile and are generally continuous along the length of the tread strip 102 and backer plate 110, respectively. The ribs are one form of holding element, which also comprises recesses and protrusions relative to the surrounding surfaces of all forms, including ribs, dimples, bumps, etc. The cross section of the recesses and protrusions may be any appropriate cross section, including rounded and/or angular cross-sections. The recesses and protrusions may be continuous, such as the ribs 140 and 144, or they may configured as a line of discrete elements.

In FIG. 9, there are two pair of the ribs 140, and two pair of the ribs 144 on either side. Although not required, providing a second rib spaced apart from a first rib allows the belt material to be compressed longitudinally to some degree for enhanced gripping.

Figure 10:
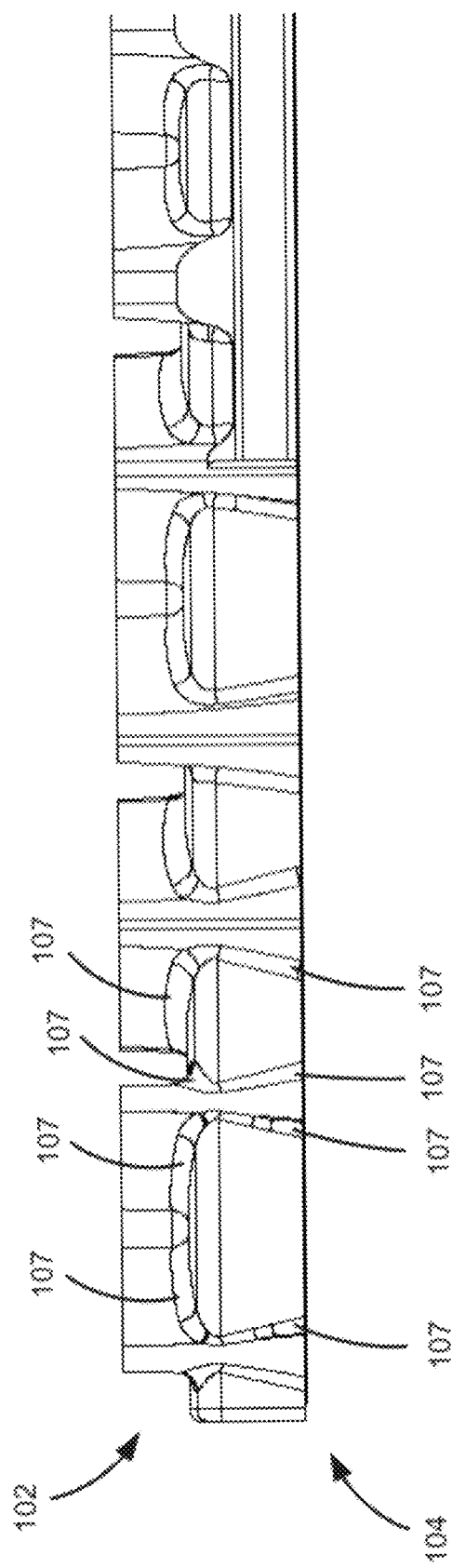
FIG. 10 is a side view showing a left portion of the traction bar in elevation as viewed in the direction of the arrow in FIG. 2.

FIG. 10 is a side view of a left portion of the tread strip 102 and the track bar 104 in elevation. As can be seen in the figure, intersecting surfaces are smoothly joined together, and in the case of surfaces that are normal relative to each other or nearly so, have radiused junctions, such as the radiused junctions 107 labeled for the two leftmost lugs.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A flexible track for a tracked vehicle, comprising a flexible belt with an inner surface and a ground-engaging surface opposite the inner surface, the ground-engaging surface comprising outwardly projecting lugs spaced apart along the track, the lugs having distal end surfaces, wherein at least two of the lugs comprise side surfaces that curve as they extend between the respective distal end surfaces and the ground-engaging surface of the belt.

2. The flexible track of claim 1, wherein the at least one of the lugs comprises a curved trailing edge opposite the curved leading edge.

3. The flexible track of claim 1, wherein the outwardly projecting lugs are spaced apart in the longitudinal direction of the ground-engaging surface.

4. The flexible track of claim 1, wherein the outwardly projecting lugs are spaced apart in a lateral direction of the ground-engaging surface.

5. The flexible track of claim 1, wherein the ground-engaging surface comprises outer surfaces of multiple track belts.

6. The flexible track of claim 1, wherein the ground-engaging surface comprises four spaced apart track belts interconnected by laterally extending tread strips.

7. The flexible track of claim 1, wherein the ground-engaging surface comprises one track belt.

8. The flexible track of claim 1, wherein the curved surfaces are defined by a splined curve.

9. The flexible track of claim 1, wherein at least an outer extent of the at least one of the lugs has a curved side surface about an entire periphery.

10. The flexible track of claim 1, wherein at least one lug comprises at least a concave curved side surface.

11. The flexible track of claim 1, wherein at least one of the lugs is in a series of generally alternating V-shaped lugs extending in a lateral direction.

12. The flexible track of claim 11, wherein at least two of the alternating V-shaped lugs are joined together.

13. A flexible track for a tracked vehicle, comprising:
- at least one flexible belt with an inner surface and an opposite outer surface surface;
- a series of track bars attached to the at least one belt and extending approximately perpendicular with respect to a direction of travel for the flexible track, an outer surface of the track bars and the flexible belts defining a ground-engaging surface;
- lugs projecting outwardly from the track bars in a repeating pattern in the direction of travel of the track, wherein the lugs have distal end surfaces and side surfaces that curve as they extending between the distal end surfaces and the ground-engaging surface of the belt,
- wherein the lugs comprise a central lug positioned along a center axis of the ground-engaging surface and oriented in a first direction of the axis, a pair of inner lugs positioned laterally outwardly on either side of the center lug, a pair of intermediate lugs positioned laterally outwardly on either side of the inner lugs and oriented in a second direction of the axis and a pair of outer lugs positioned laterally outward of the intermediate lugs and oriented in the first direction.

14. The flexible track of claim 13, wherein the at least one flexible belt comprises four belts that are spaced apart from each other, including one pair of inner belts and one pair of outer belts, and wherein the outer belts are narrower than the inner belts.

15. The flexible track of claim 13, wherein the central lug, the pair of intermediate lugs and the pair of outer lugs are generally V-shaped, and the pair of inner lugs are each shaped as a first V-shaped lug oriented in the first direction merged laterally with a second V-shaped lug in the second direction.

16. The flexible track of claim 13, wherein the track comprises a series of drive saddles attached to project in an inward direction opposite the drive lugs, the drive saddles being shaped to guide the flexible track as the flexible track travels along guide wheels of the tracked vehicle.

17. The flexible track of claim 13, wherein the repeating pattern in which the lugs are arranged is bi-directional and allows the flexible track to be circulated in either direction to drive the tracked vehicle.

18. The flexible track of claim 13, wherein the curved surfaces of the lugs have an average curvature that can be expressed as a second order polynomial equation based on the height of the lug.

19. A flexible track for a tracked vehicle, comprising a flexible belt with an inner belt surface, an opposite outer belt surface and at least one track bar attached to the outer surface and extending approximately perpendicular to a direction of the track's travel, the track bar having an outer surface with projecting traction lugs and an inner surface with at least one holding element, wherein at least two of the traction lugs have curved side surfaces that curve in a radial direction between respective distal end surfaces of the lugs and a ground engaging surface of the belt, and wherein when the track bar is tightened against the outer belt surface, the holding element engages the outer belt surface, thereby reducing slipping between the flexible belt and the track bar.

20. The flexible track of claim 19, wherein the holding element is configured as at least one raised rib.

21. The flexible track of claim 19, wherein the flexible belt is configured in multiple belt sections, and wherein the attachments of the track bar to the multiple belts assist in maintaining the multiple belt sections in desired positions relative to each other.

22. The flexible track of claim 19, wherein the track bar has a two-piece construction, and wherein the outer surface with the multiple projecting lugs is formed of a resilient material, and wherein the inner surface is formed of a metal.

23. The flexible track of claim 20, wherein the at least one rib comprises a pair of ribs.

24. The flexible track of claim 20, wherein the at least one rib comprises at least one rib positioned on each side of a central axis of the track bar.

25. The flexible track of claim 20, wherein the at least one rib comprises at least one pair of ribs positioned on either side of a central axis of the track bar.

26. The flexible track of claim 20, wherein the at least one rib has a generally triangular cross-section.

27. The flexible track of claim 20, wherein the rib and inner surface of the track bar are made of a metal and flexible belt is made of a resilient material, and wherein when the track bar is installed on the flexible belt, the track bar's deformation of the resilient material serves to keep the track bar in place.

28. The flexible track of claim 19, further comprising a backer plate and at least one bolt, and wherein the track bar is attached to the outer surface of the belt by threaded engagement between the at least one bolt extending through the backer plate, through the belt and into the track bar.

29. The flexible track of claim 21, wherein the backer plate comprises at least one holding element to hold the backer plate against a surface of the belt.

* * * * *

UNITED STATES PATENT AND TRADEMARK OFFICE
CERTIFICATE OF CORRECTION

PATENT NO. : 8,672,424 B2
APPLICATION NO. : 13/028115
DATED : March 18, 2014
INVENTOR(S) : Jasper J. Tucker, Jr. et al.

It is certified that error appears in the above-identified patent and that said Letters Patent is hereby corrected as shown below:

In the Claims:

Column 6, line 57, "a splined curve." should read --a spline curve.--.

Signed and Sealed this
Eighth Day of March, 2016

Michelle K. Lee
*Director of the United States Patent and Trademark Office*